United States Patent
Verner et al.

(10) Patent No.: US 8,504,278 B2
(45) Date of Patent: Aug. 6, 2013

(54) METHOD AND SYSTEM FOR DETECTING A FAULT DURING CATALYST LIGHT-OFF

(75) Inventors: Douglas R. Verner, Sterling Heights, MI (US); Jonathan T. Shibata, Whitmore Lake, MI (US); Allen B. Rayl, Waterford, MI (US); Halim G Santoso, Novi, MI (US); Kenneth J. Buslepp, Brighton, MI (US)

(73) Assignee: GM Global Technology Operations LLC

( * ) Notice: Subject to any disclaimer, the term of this patent is extended or adjusted under 35 U.S.C. 154(b) by 933 days.

(21) Appl. No.: 12/608,254

(22) Filed: Oct. 29, 2009

(65) Prior Publication Data

US 2011/0106392 A1 May 5, 2011

(51) Int. Cl.
F02D 41/22 (2006.01)
F02D 41/00 (2006.01)
F01N 3/10 (2006.01)
F02M 57/04 (2006.01)
F02M 57/06 (2006.01)
F02B 3/00 (2006.01)
F02B 17/00 (2006.01)

(52) U.S. Cl.
USPC .......... 701/109; 701/113; 123/697; 123/703; 60/299; 60/300; 60/303

(58) Field of Classification Search
USPC .............. 123/295, 296, 297, 299, 300, 688, 123/676, 697, 703; 701/101, 102, 103, 104, 701/105, 109, 113; 60/299, 300, 303
See application file for complete search history.

(56) References Cited

U.S. PATENT DOCUMENTS

| | | | |
|---|---|---|---|
| 5,245,979 A * | 9/1993 | Pursifull et al. | 123/690 |
| 6,244,241 B1 * | 6/2001 | Mamiya et al. | 123/295 |
| 6,345,499 B1 | 2/2002 | Nishimura et al. | |
| 6,843,240 B1 * | 1/2005 | Hahn et al. | 123/688 |
| 7,680,587 B2 * | 3/2010 | Elfvik | 701/114 |
| 2003/0212484 A1 | 11/2003 | Takebayashi et al. | |
| 2004/0123834 A1 * | 7/2004 | Wagner et al. | 123/295 |
| 2008/0154481 A1 * | 6/2008 | Stroia et al. | 701/109 |
| 2008/0178853 A1 * | 7/2008 | Yamaoka et al. | 123/568.11 |
| 2009/0038289 A1 * | 2/2009 | Oh-Hori et al. | 60/285 |

FOREIGN PATENT DOCUMENTS

| | | | |
|---|---|---|---|
| DE | 19541903 | * | 5/1997 |
| DE | 19541903 A1 | | 5/1997 |
| DE | 10163022 A1 | | 7/2003 |
| DE | 200410062015 A1 | | 7/2006 |
| EP | 0773355 | | 5/1997 |
| JP | 03113355 A | | 5/1991 |

OTHER PUBLICATIONS

Office Action dated Aug. 10, 2012 from the German Patent Office for German Patent Application No. 10 2010 049 288.4, 6 pages.

* cited by examiner

*Primary Examiner* — Stephen K Cronin
*Assistant Examiner* — Raza Najmuddin

(57) ABSTRACT

A system and method for controlling engine operation includes a timer module that determines a time period from when a catalyst light-off mode is entered to when an oxygen sensor signal reaches an oxygen sensor threshold and a comparison module that generates an error signal and determines when the time period is above a time threshold.

20 Claims, 7 Drawing Sheets

METHOD AND SYSTEM FOR DETECTING A FAULT DURING CATALYST LIGHT-OFF

FIELD

The present invention relates generally to engine controls for automotive vehicles and, more specifically, to a method and apparatus for detecting a fault during catalyst light-off.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A catalyst may be used to change exhaust gas constituents. A catalyst does not fully convert exhaust gases until it is heated to a desired temperature. The desired temperature may be referred to as an activation temperature. Typically, an engine is started from a cold start. To reduce the amount of time to reach the activation temperature, the engine may be operated in a certain manner. Secondary air injection is one way to increase the catalyst temperature more rapidly. The increased cost and complexity of the system may be undesirable.

Another way to increase the temperature of the catalyst to the catalyst light-off temperature is to provide split-pulse injection. A split-pulse injection divides the amount of fuel to be injected into the cylinder into a primary pulse and a secondary pulse that occurs at a later time than the primary pulse. The secondary pulse may vary greatly. Regulating authorities require monitoring each injection event. The size of the secondary pulse may vary. When the secondary pulse becomes too small, detection of the secondary fuel injection event may not be achieved in a conventional manner.

SUMMARY

The present disclosure provides a system and method for detecting an error in the catalyst light-off mode corresponding to a missed fuel injection. The system and method uses the time associated with the increase of the temperature of the oxygen sensor. It has been found that the oxygen sensors voltage is reduced from a high impedance voltage source supplied by the controller because the impedance decreases as the oxygen sensor warms up. The increased heat in the exhaust system indicates that the catalyst light-off mode is operating properly.

In one aspect of the invention, a method of operating an engine includes entering a catalyst light-off mode, initiating a timer in response to entering a catalyst light-off mode, generating an oxygen sensor signal, when the oxygen sensor signal reaches an oxygen sensor threshold, determining a time period from the timer, when the time period is above a time threshold, generating an error signal.

In another aspect of the invention, a control system for controlling an engine operation includes a timer module that determines a time period from when a catalyst light-off mode is entered to when an oxygen sensor signal reaches an oxygen sensor threshold and comparison module that generates an error signal and determines when the time period is above a time threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a plot of engine speed, the exhaust gas sensor output, the upstream exhaust gas temperature sensor, and the catalyst temperature with the catalyst light-off operation OFF and the exhaust gas oxygen sensor heater ON;

DETAILED DESCRIPTION

Figure 1:
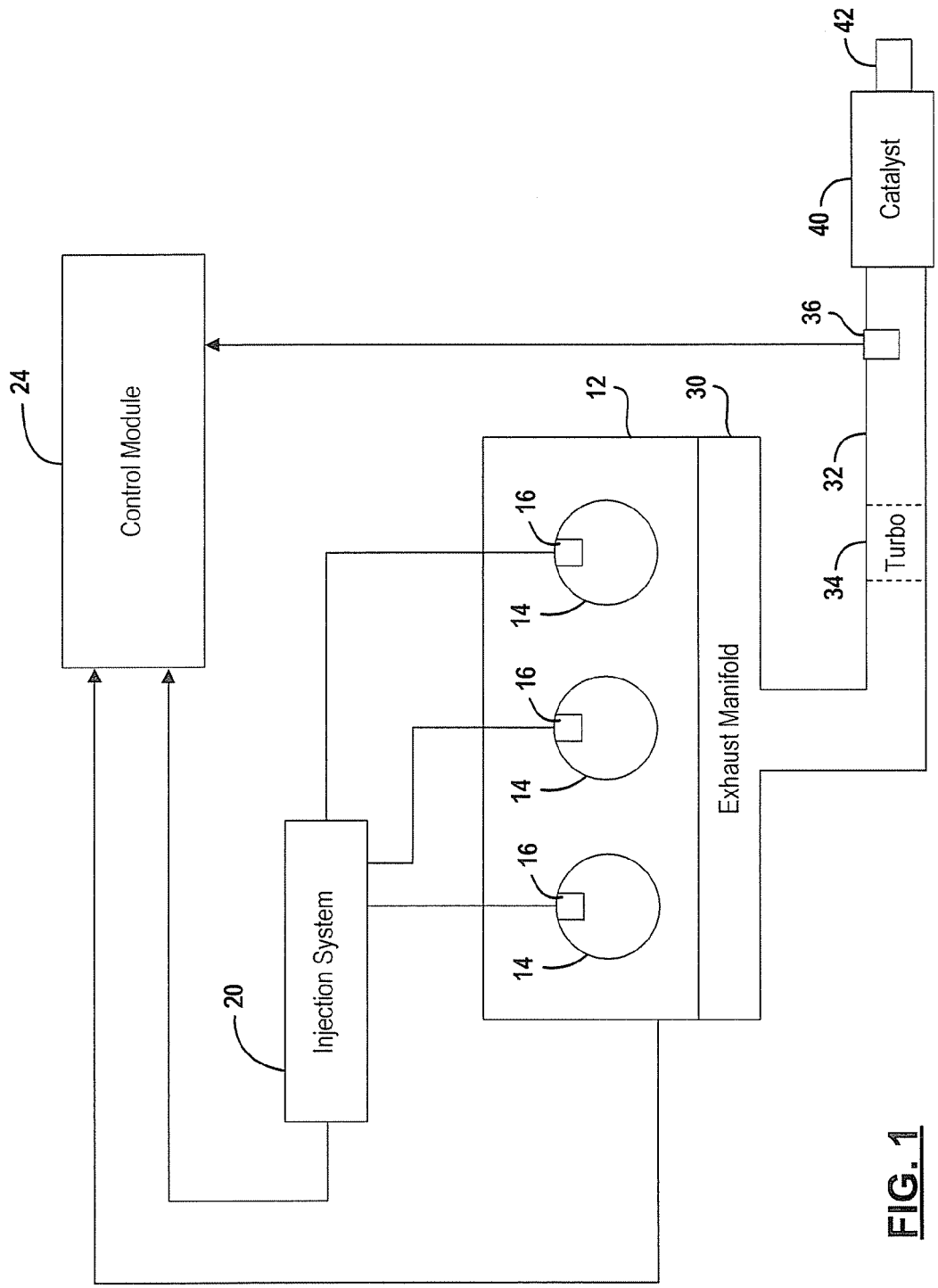
FIG. 1 is a high level schematic view of an engine for performing catalyst light-off operation according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term "module" refers to an Application Specific Integrated Circuit ("ASIC"), an electronic circuit, a processor (shared, dedicated, or group), and memory that execute one or more software or firmware programs, a combinational logic circuit, and/or other suitable components that provide the described functionality.

Referring now to FIG. 1, an engine 12 is illustrated having a plurality of cylinders 14. In the present illustration, three cylinders 14 are shown; however, the engine 12 may include a various number of cylinders 14 including, but not limited to, two, four, five, six, eight and twelve. Each cylinder 14 may include a fuel injector 16. Injection directly into a cylinder 14 is referred to as direct injection.

An injection system 20 controls the operation of the fuel injectors 16 based upon an output from a control module 24. The control module 24 may control the engine operating characteristics of the vehicle including the injection system 20 and other fuel-related components. The injection system 20 may generate split-pulse injection having a primary pulse and a secondary pulse occurring later than the primary pulse. The secondary pulse may be a smaller than the primary pulse and is specifically designed to increase the exhaust gas temperature varying catalyst to catalyst light-off. As will be described below, the split-pulse injections may be performed after a cold start of the engine 12. Cold start occurs after the engine 12 and the catalyst 40 have cooled to ambient temperature.

The exhaust from the cylinders 14 of the engine 12 exit through the exhaust manifold 30. The exhaust manifold 30 collects the exhaust gases and leads the exhaust gases to an exhaust conduit 32. The exhaust conduit 32 may have a turbine portion of a turbo charger 34 therein. The exhaust conduit 32 may also include an exhaust gas oxygen sensor 36. The exhaust gas oxygen sensor 36 may include a heater (not shown). The exhaust gas oxygen sensor 36 may have a reduced impedance when the temperature of the sensor increases. When the impedance decreases, the voltage across the exhaust gas oxygen sensor 36 decreases as well. Due to the high impedance voltage source supplied by the controller.

The catalyst 40 may also be disposed within the exhaust conduit 32. The catalyst 40 may be a three-way catalyst that is used for reducing exhaust gas constituents when heated. When the catalyst 40 reaches a light-off temperature, the catalyst 40 is efficiently converting constituents of the exhaust gases into other forms. The catalyst 40 may be used for removing hydrocarbons, carbon monoxide and oxides of nitrogen from the exhaust gases. After the catalyst 40, a tailpipe 42 vents the exhaust gases to the atmosphere.

Figure 2:
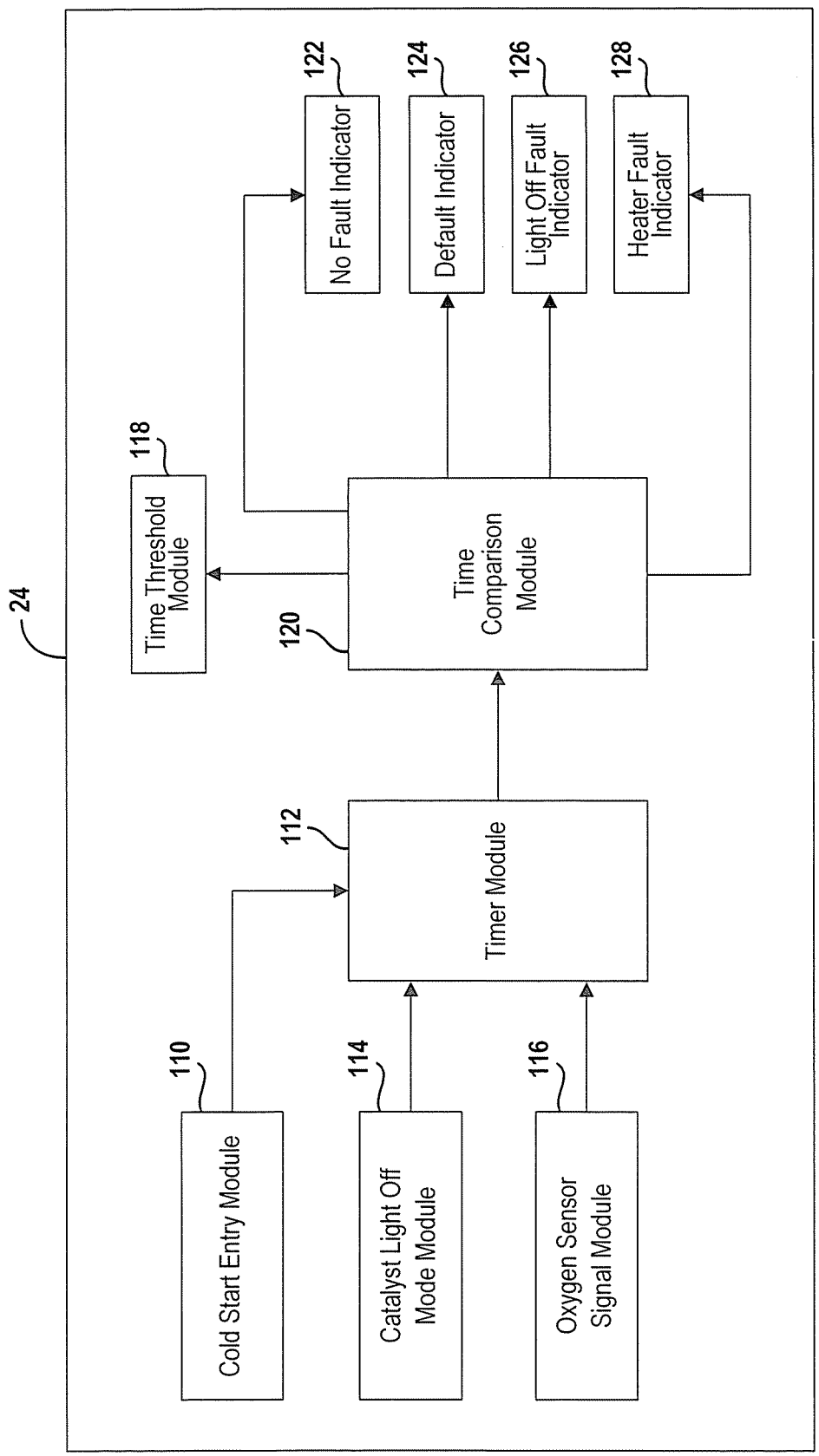
FIG. 2 is a block diagrammatic view of the engine controller of FIG. 1.

Referring now to FIG. 2, the control module 24 is illustrated in further detail. The control module 24 may include a cold-start entry module 110. The cold-start entry module 110 is activated upon the cold start of the engine. The cold-start entry module 110 may be activated when the engine has not been started for a predetermined amount of time, or when temperature sensors (not shown) indicate that the catalyst 40 may be cold. The cold-start entry module 110 may be in communication with a timer module 112 that determines the time period from the last ignition OFF. A catalyst light-off mode module 114 may activate a catalyst light-off procedure for increasing the temperature of the catalyst to a predetermined temperature more rapidly than normal engine operation. As mentioned above, a split-pulse injection may be used to increase the exhaust temperatures and to increase the catalyst temperature to more rapidly reduce exhaust gas constituents. When entering the catalyst light-off mode from the module 114, the timer module 112 may determine a time period from entering the catalyst light-off mode to the time the catalyst has increased to light-off temperature.

To determine whether the catalyst has increased in temperature, the exhaust sensor signal module 116 may generate an oxygen sensor signal corresponding to a characteristic of the exhaust gas temperature. For example, when the oxygen sensor temperature increases, the impedance decreases. This causes the voltage to also decrease. Therefore, the impedance or the voltage may be monitored. When the voltage or impedance decreases to an oxygen sensor threshold, the timer module 112 may provide a period from the entry of the catalyst light-off mode to the time when the oxygen sensor indicates the temperature has increased. The time period between the cold-start entry and the oxygen sensor reading a predetermined voltage or impedance indicative of the oxygen sensor heating may be provided to a time comparison module 120. The time comparison module 120 may compare the time period described above to a time threshold. The time threshold may be obtained from a time threshold module 118. The time threshold module 118 may be a memory used to store a time threshold. Of course, the time threshold module 118 may be used to store multiple time thresholds, as will be described below.

The time comparison module 120 may provide a no-fault indicator signal 122 when the time period is less than the time threshold. A fault indicator may be generated when the time is greater than the time threshold, using a fault indicator signal 124.

The time comparison module 120 may also characterize the time. Multiple thresholds may be obtained so that a determination of an error may be performed. A light-off indicator signal 126 may be generated when the light-off procedure is not operating properly. The time comparison module 120 may also generate a heater fault indicator signal 128. The heater fault indicator signal 128 may correspond to a fault in the operation of the heater within the oxygen sensor. To generate the light-off indicator signal 126 or the heater fault indicator signal 128, time comparisons using the period of time between the cold-start entry and a respective light-off threshold or heater fault threshold may be performed. The determination of the light-off fault and the heater fault will be evident by comparing the graphs in FIGS. 4-7.

Figure 3:
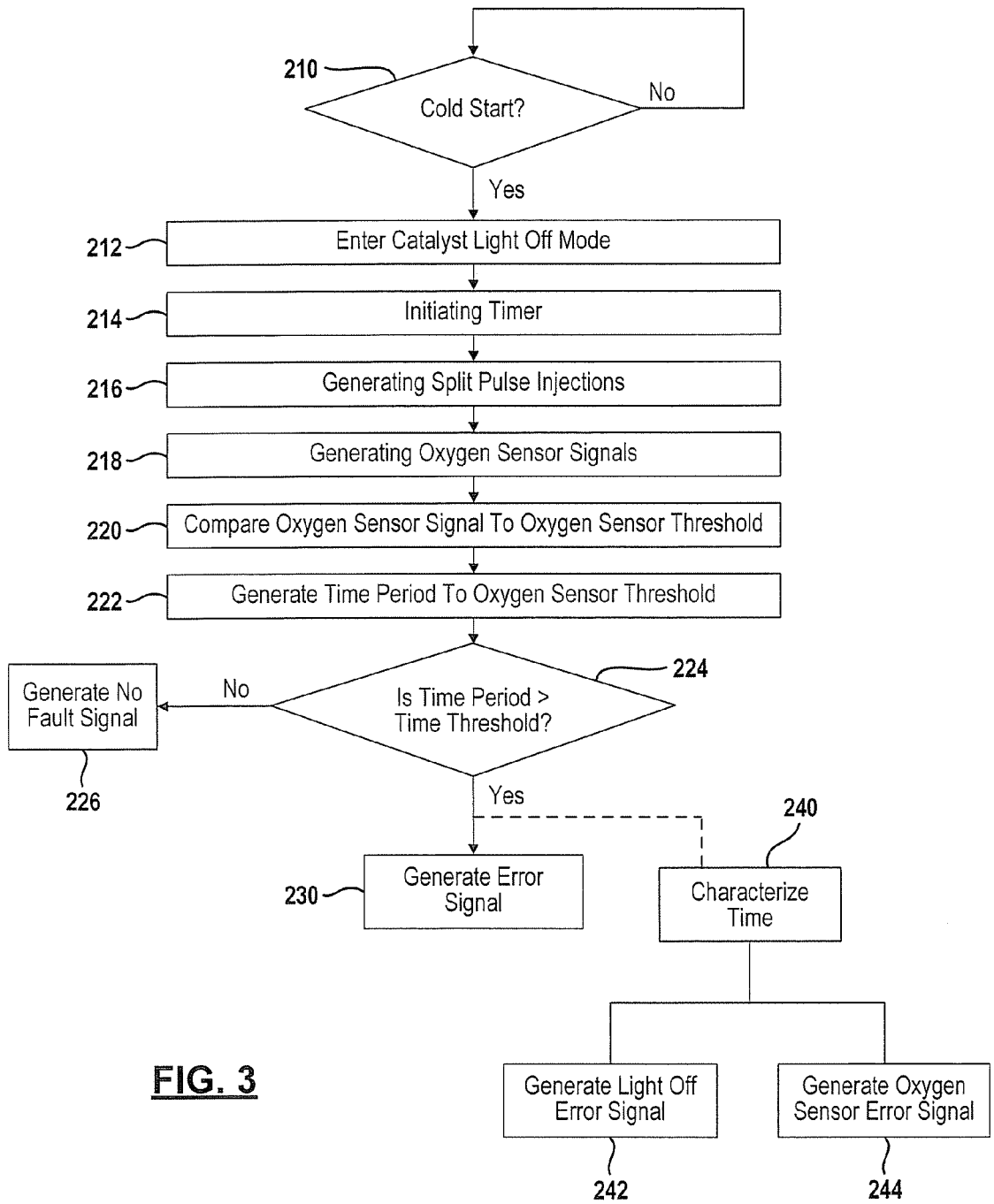
FIG. 3 is a flowchart of a method of operating the invention.

Referring now to FIG. 3, a method of operating the engine 12 during a catalyst light-off period is illustrated. In step 210, it is determined whether or not the engine is in cold start. As mentioned above, the cold-start determination may be performed by measuring the temperatures of different components for a time period since the last ignition. The following method applies to a cold start of the engine. If a cold start is not performed, step 210 is again performed.

In step 210, if a cold start is being performed, step 212 is performed. In step 212, the catalyst light-off mode is entered. In step 214, a timer may be initiated upon entering the catalyst light-off mode. In step 216, the catalyst light-off mode may be performed by providing split-pulse injections to the fuel injectors of the engine. Split-pulses may be performed by splitting the pulses into a primary pulse and a secondary pulse. The secondary pulse may be less than the primary pulse and occurs at a time later than the primary pulse.

In step 218, the oxygen sensor signals are monitored. In this example, the voltage of the oxygen sensor may also be monitored. As mentioned above, as the oxygen sensor heats up due to the exhaust gas temperature increase, the impedance reduces and the voltage at the oxygen sensor is also reduced. Of course, other oxygen sensor characteristics, such as current, may be used to determine a change of temperature at the oxygen sensor.

In step 220, the oxygen sensor signal is compared to an oxygen sensor threshold. The oxygen sensor threshold corresponds to a temperature of the oxygen sensor. In step 222, the time period from the initiation of the catalyst light-off mode to reach the oxygen sensor threshold is determined. In step 224, the time period is compared to a time threshold. If the time period is not greater than the time threshold, there is no fault in the catalyst light-off process and step 226 generates a no-fault indicator signal or generates no signal at all.

In step 224, when the time period is greater than the time threshold, step 230 generates an error signal. The error signal corresponds to a catalyst light-off mode operation error, which may correspond to a secondary pulse not injecting fuel.

Optional steps may characterize the comparison of the time period to the time threshold in step 240. By characterizing the time, multiple time thresholds may be set forth for generating a light-off error signal 242 or an oxygen sensor error signal 244. Both the light-off error signal 242 and the oxygen sensor error signal 244 may be generated to correspond to a time period for reaching the temperature of the catalyst. The time thresholds associated with the light-off error signal 242 or the oxygen sensor error signal 244 may vary, depending upon the characteristics of the engine and injection system.

Figure 4:
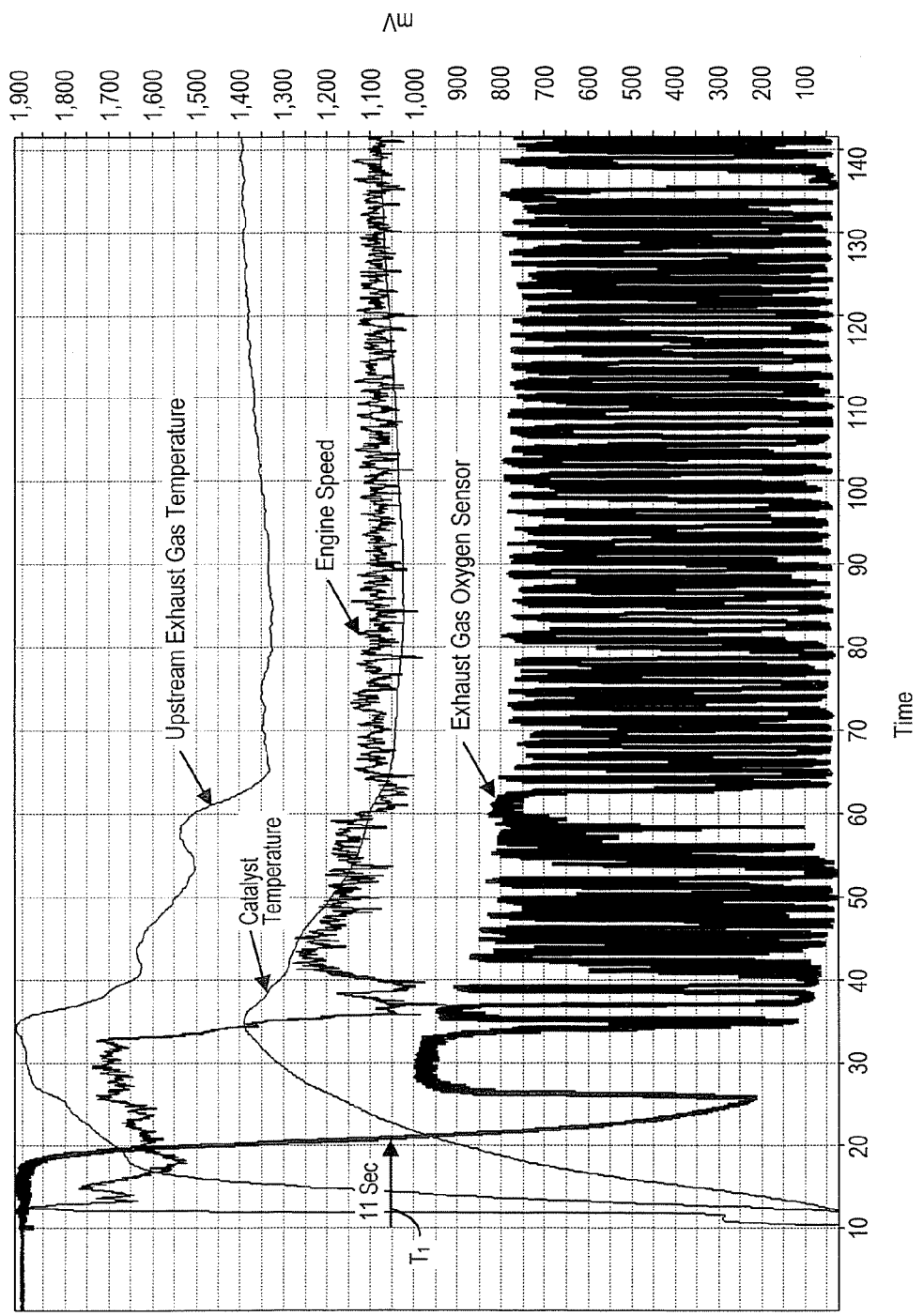
FIG. 4 is a plot of engine speed, an exhaust gas sensor output, an upstream exhaust gas temperature sensor, and a catalyst temperature during normal operation.

Referring now to FIG. 4, a plot illustrating the engine speed signal, the exhaust gas oxygen sensor voltage, the catalyst temperature, and the upstream exhaust gas temperature signal is shown. The engine speed rapidly increases at 10 seconds, indicating that the engine has been turned ON and a cold start has been performed. The catalyst light-off mode is initiated at this point. A time period $T_1$ of 11 seconds illustrates the time for the impedance of the oxygen sensor to be reduced to a predetermined level. The predetermined level in this case is about 1,050 mV. This level corresponds to a level indicative that the exhaust gas temperatures have increased. The catalyst temperature increases. Likewise, the upstream exhaust gas temperature signal also increases for a predetermined amount of time, and then levels out at around 65 seconds. The upstream exhaust gas temperature signal may be measured from a temperature sensor in the exhaust stream. In operation, this temperature sensor signal may not be provided; but the test vehicle from which FIG. 4 was generated included such a sensor for verification. Likewise, the catalyst temperature signal may also not be provided in a production vehicle. The catalyst temperature signal may be provided merely for verification purposes in a test vehicle.

Figure 5:
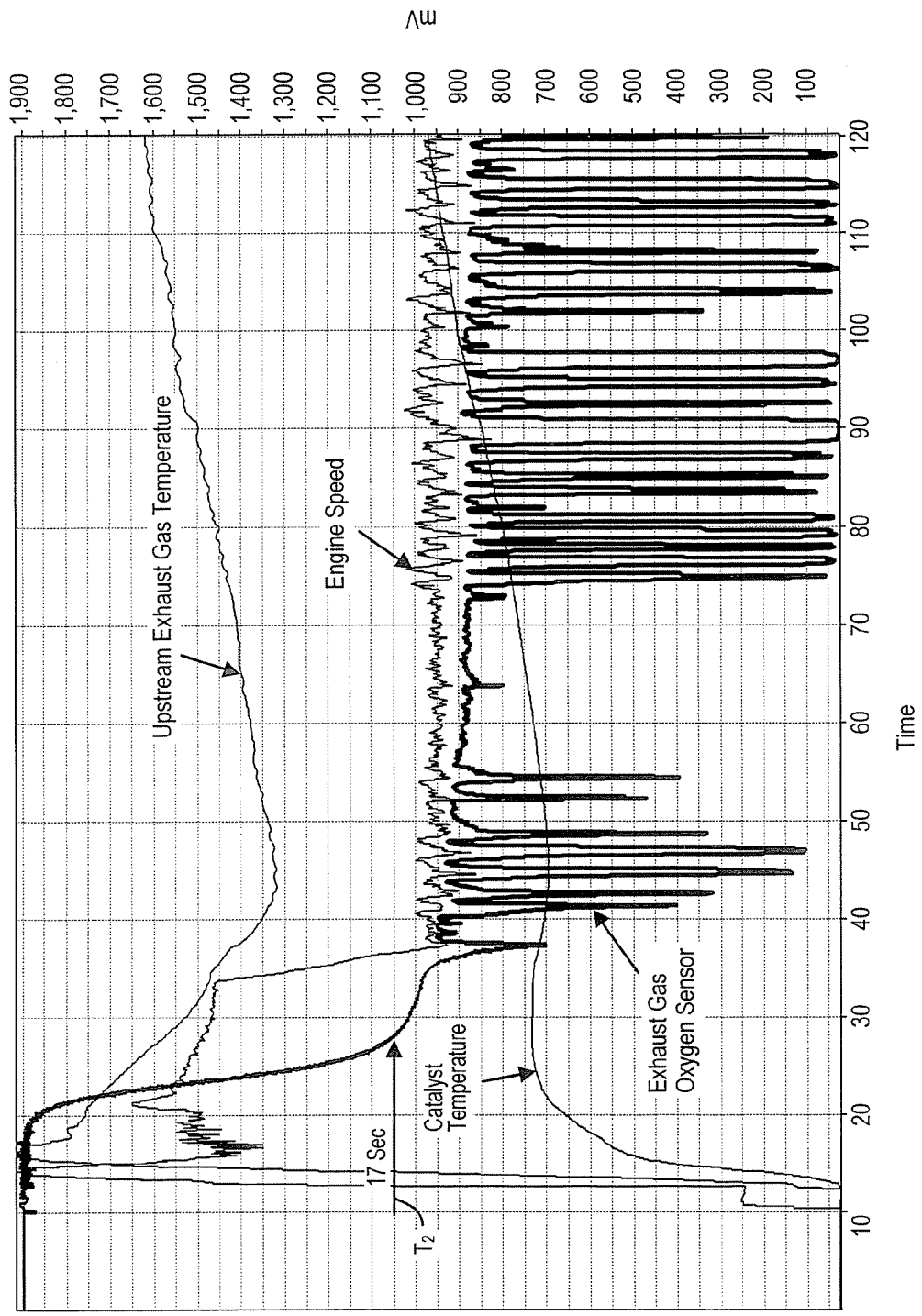

Referring now to FIG. 5, the same signals of FIG. 4 are illustrated. In this case, the catalyst light-off operation is OFF and the exhaust gas oxygen heater is ON. The time $T_2$ for the oxygen sensor to reach 1,050 mV is 17 seconds.

Figure 6:
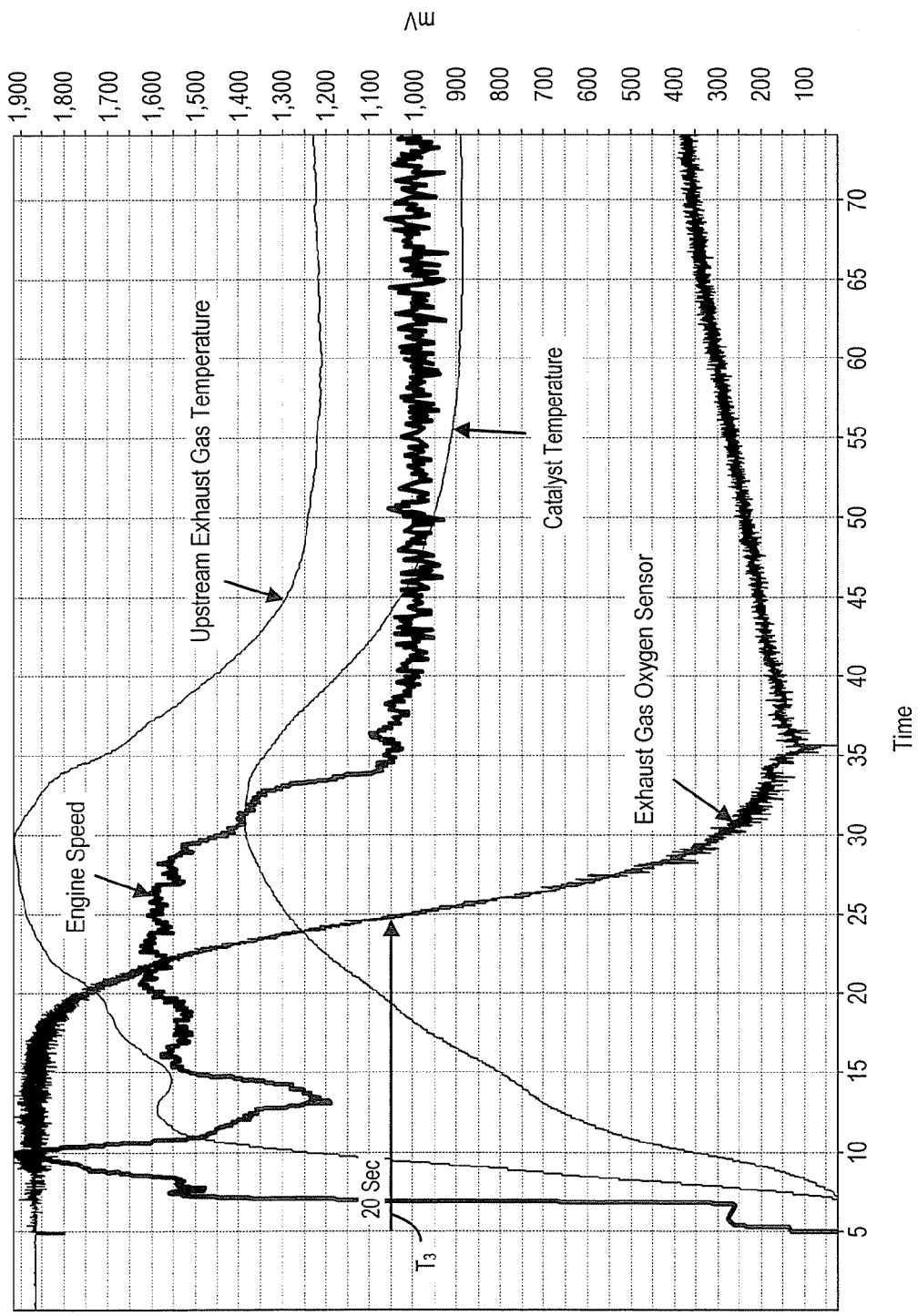
FIG. 6 is a plot of engine speed, the exhaust gas sensor output, the upstream exhaust gas temperature sensor, and the catalyst temperature with the catalyst light-off operation ON and the exhaust gas oxygen sensor heater OFF.

Referring now to FIG. 6, the time period $T_3$ for the catalyst to reach 1,050 mV is about 20 seconds. In this example, the catalyst light-off operation is ON, whereas the exhaust gas oxygen heater is OFF or failed. As can be seen by comparing FIGS. 5 and 6, the catalyst light-off procedure being OFF increases the time period less than the time of the oxygen sensor failing.

Figure 7:
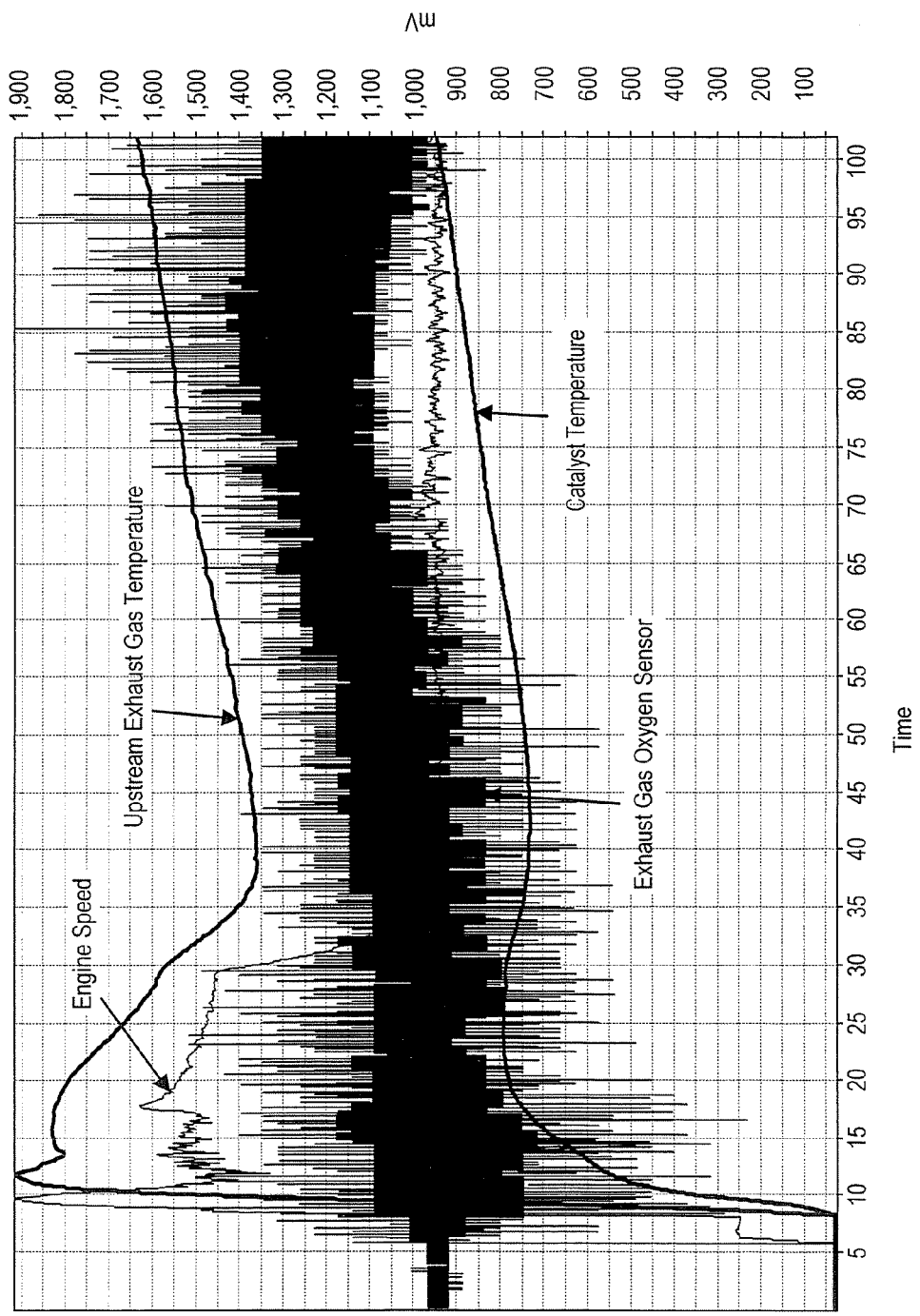
FIG. 7 is a plot of engine speed, the exhaust gas sensor output, the upstream exhaust gas temperature sensor, and the catalyst temperature with the catalyst light-off operation OFF and the exhaust gas oxygen sensor heater OFF.

Referring now to FIG. 7, when both the catalyst light-off operation and the exhaust oxygen sensor heater are OFF, the catalyst does not increase above the catalyst light-off temperature.

Thus, by monitoring the temperature of the oxygen sensor or a corresponding characteristic of the oxygen sensor, a determination may be made that the oxygen sensor heater is OFF or the catalyst light-off procedure is OFF, or both.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of controlling engine operation, the method comprising:
   entering a catalyst light-off mode;
   initiating a timer in response to entering the catalyst light-off mode;
   generating an oxygen sensor signal;
   when the oxygen sensor signal reaches an oxygen sensor threshold, determining a time period from the timer; and
   when the time period is greater than a first time threshold, generating a first error signal corresponding to an oxygen sensor heater error.

2. A method as recited in claim 1 further comprising generating a no-fault signal when the time period is less than the first time threshold.

3. A method as recited in claim 1 further comprising generating a second error signal corresponding to a catalyst light-off mode error when the time period is less than the first time threshold and greater than a second time threshold.

4. A method as recited in claim 1 wherein after entering the catalyst light-off mode, providing split-pulse fuel injection into cylinders of the engine that comprise a first pulse and a second pulse.

5. A method as recited in claim 4 further comprising generating a second error signal corresponding to a split-pulse error when the time period is less than the first time threshold and greater than a second time threshold.

6. A method as recited in claim 4 further comprising generating a second error signal corresponding to a missed second pulse when the time period is less than the first time threshold and greater than a second time threshold.

7. A method as recited in claim 1 wherein generating an oxygen sensor signal comprises generating an oxygen sensor signal corresponding to a catalyst temperature.

8. A method as recited in claim 1 wherein generating an oxygen sensor signal comprises an oxygen sensor voltage signal.

9. A method as recited in claim 8 wherein the oxygen sensor voltage signal corresponds to an oxygen sensor impedance.

10. A system for controlling engine operation, comprising:
    a timer module that determines a time period from when a catalyst light-off mode is entered to when an oxygen sensor signal reaches an oxygen sensor threshold; and
    a comparison module that generates a first error signal corresponding to an oxygen sensor heater error when the time period is greater than a first time threshold.

11. A system as recited in claim 10 wherein the comparison module generates a no-fault signal when the time period is less than the time threshold.

12. A system as recited in claim 10 wherein the comparison module generates a second error signal corresponding to a catalyst light-off mode error when the time period is less than the first time threshold and greater than a second time threshold.

13. A system as recited in claim 10 further comprising a catalyst light-off mode module that generates a split-pulse fuel injection into cylinders of the engine comprising a first pulse and a second pulse.

14. A system as recited in claim 13 wherein the comparison module generates a second error signal corresponding to a split-pulse error when the time period is less than the first time threshold and greater than a second time threshold.

15. A system as recited in claim 13 wherein the comparison module generates a second error signal corresponding to a missed second pulse when the time period is less than the first time threshold and greater than a second time threshold.

16. A system as recited in claim 10 wherein generating an oxygen sensor signal comprises generating an oxygen sensor signal corresponding to a catalyst temperature.

17. A system as recited in claim 10 wherein the oxygen sensor signal comprises an oxygen sensor voltage signal.

18. A system as recited in claim 17 wherein the oxygen sensor voltage signal corresponds to an oxygen sensor impedance.

19. A method as recited in claim 1 further comprising generating a second sensor error signal corresponding to both the oxygen sensor heater error and a catalyst light-off mode error when the time period is greater than a second time threshold, wherein the second time threshold is greater than the first time threshold.

20. A system as recited in claim 10 wherein the comparison module generates a second sensor error signal corresponding to both the oxygen sensor heater error and a catalyst light-off mode error when the time period is greater than a second time threshold, wherein the second time threshold is greater than the first time threshold.

* * * * *